US00RE41077E

(19) United States
(12) Reissued Patent
Marino et al.

(10) Patent Number: US RE41,077 E
(45) Date of Reissued Patent: Jan. 19, 2010

(54) STATION CONTROL SYSTEM FOR A DRIVERLESS VEHICLE

(75) Inventors: Mark Marino, Petoskey, MI (US); Wayne D. Ross, Petoskey, MI (US)

(73) Assignee: Jervis B. Webb Company, Farmington Hills, MI (US)

(21) Appl. No.: 11/820,792

(22) Filed: Jun. 20, 2007

Related U.S. Patent Documents

Reissue of:
(64) Patent No.: 7,174,836
Issued: Feb. 13, 2007
Appl. No.: 10/407,002
Filed: Apr. 4, 2003

U.S. Applications:
(
(60) Provisional application No. 60/370,528, filed on Apr. 5, 2002.

(51) Int. Cl.
*B61J 3/00* (2006.01)
*B60T 7/16* (2006.01)

(52) U.S. Cl. ..... 104/88.02; 180/167
(58) Field of Classification Search ..... 104/88.01, 104/88.02; 246/2 R, 5, 167 R, 182 R, 182 C, 246/184
See application file for complete search history.

(56) References Cited

U.S. PATENT DOCUMENTS

| | | | |
|---|---|---|---|
| 4,168,760 | A | 9/1979 | Paul, Jr. et al. |
| 4,361,300 | A | 11/1982 | Rush |
| 4,530,056 | A | 7/1985 | MacKinnon et al. |
| 4,630,216 | A | 12/1986 | Tyler et al. |
| 4,716,530 | A | 12/1987 | Ogawa et al. |
| 4,780,817 | A | 10/1988 | Lofgren |
| 4,802,096 | A | 1/1989 | Hainsworth et al. |
| 4,847,773 | A | 7/1989 | van Helsdingen et al. |
| 4,956,777 | A | 9/1990 | Cearley et al. |
| 5,216,605 | A | 6/1993 | Yardley et al. |
| 5,219,036 | A | 6/1993 | Schwager et al. |
| 5,267,173 | A | 11/1993 | Tanizawa et al. |
| 5,280,431 | A | 1/1994 | Summerville et al. |
| 5,305,217 | A | 4/1994 | Nakamura et al. |
| 5,329,449 | A | 7/1994 | Tanizawa et al. |
| 5,367,456 | A | 11/1994 | Summerville et al. |
| 5,928,294 | A | 7/1999 | Zelinkovsky |
| 6,049,745 | A | 4/2000 | Douglas et al. |
| 6,061,614 | A | 5/2000 | Carrender et al. |
| 6,092,010 | A | 7/2000 | Alofs et al. |
| 6,122,573 | A | 9/2000 | Higashi et al. |
| 6,272,406 | B2 | 8/2001 | Alofs et al. |
| 6,377,888 | B1 | 4/2002 | Olch |
| 6,507,777 | B1 | 1/2003 | Pinlam et al. |
| 2001/0001843 | A1 | 5/2001 | Alois et al. |

FOREIGN PATENT DOCUMENTS

| | | |
|---|---|---|
| JP | 4-160413 | 6/1992 |
| WO | WO 92/09941 | 6/1992 |

*Primary Examiner*—Robert J McCarry, Jr.
(74) *Attorney, Agent, or Firm*—Dickinson Wright PLLC

(57) ABSTRACT

A station control system for and method of controlling the operation of a driverless vehicle. The system includes a vehicle travel path, a plurality of station tags in readable proximity to the travel path, and a vehicle movable along the travel path. Each of the tags are pre-programmed with a unique and arbitrary tag identifier. The vehicle has a tag reader and a controller communicating with the reader with the tag reader is configured to read tag identifiers from the tags. The controller is configured to receive the tag identifiers from the tag reader and access a correlation table having a function command associated with the tag identifier. The method includes the steps of reading the tag identifier associated with one of the plurality of tags, accessing the correlation table to identify a command in the function field associated with the tag identifier, and executing any identified command.

20 Claims, 1 Drawing Sheet

24

| TAG IDENTIFIER | LOCATION | FUNCTION |
|---|---|---|
| TAG 1 | ZONE 1 | SWITCH TO DEAD RECKONING GUIDANCE |
| TAG 2 | ZONE 2 | SWITCH TO WIRE GUIDANCE |
| TAG 3 | ZONE 2 | STOP - UNLOAD VEHICLE |
| TAG 4 | ZONE 3 | STOP - CHECK INTERSECTION |

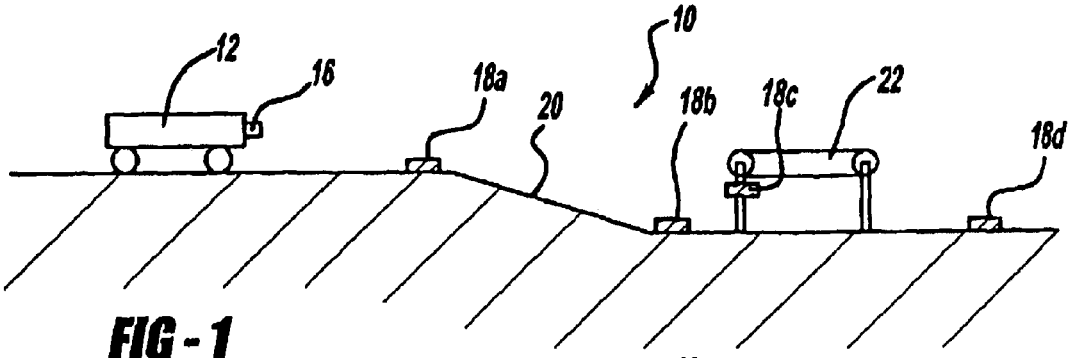
FIG - 1
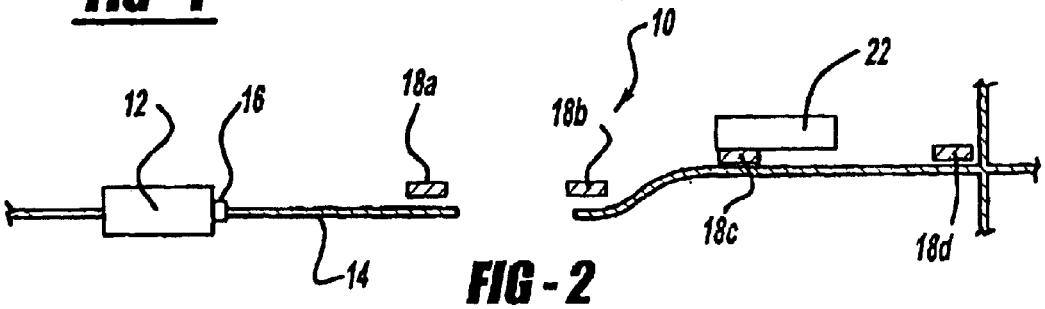
FIG - 2
24
| TAG IDENTIFIER | LOCATION | FUNCTION |
|---|---|---|
| TAG 1 | ZONE 1 | SWITCH TO DEAD RECKONING GUIDANCE |
| TAG 2 | ZONE 2 | SWITCH TO WIRE GUIDANCE |
| TAG 3 | ZONE 2 | STOP - UNLOAD VEHICLE |
| TAG 4 | ZONE 3 | STOP - CHECK INTERSECTION |
| | | |
FIG - 3
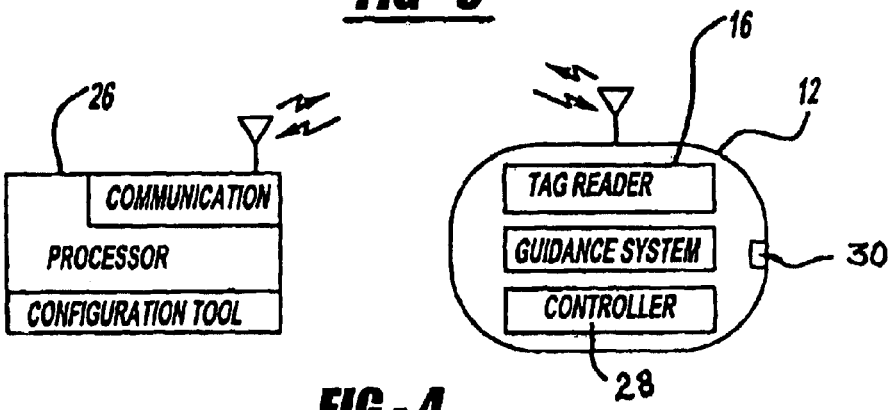
FIG - 4

STATION CONTROL SYSTEM FOR A DRIVERLESS VEHICLE

Matter enclosed in heavy brackets [ ] appears in the original patent but forms no part of this reissue specification; matter printed in italics indicates the additions made by reissue.

*CROSS-REFERENCE TO RELATED APPLICATION*

*This patent application claims priority to U.S. Provisional Patent Application Ser. No. 60/370,528, filed Apr. 5, 2002 which is incorporated by reference in its entirety.*

BACKGROUND OF THE INVENTION

The present invention relates to a station control system for a driverless vehicle and, more particularly, to a system for controlling functional operations to be performed at one or more stations along the path of a driverless vehicle.

There are many known systems for guiding a driverless vehicle, including inertial guidance systems, active or passive wire guidance systems, optical guidance systems, and magnetic guidance systems. Absolute position indicators are commonly disposed along the vehicle guide path to provide periodic absolute position updates to the vehicle guidance system thereby increasing guidance accuracy and ensuring proper positioning of the vehicle. A variety of position indicators are commonly used, including lasers, optics, and floor-disposed position indicators. The floor-disposed position indicators provide the vehicle guidance system with the position of the vehicle in an absolute coordinate system. Such position indicators and the corresponding readers are expensive, require labor-intensive installation, and detailed surveying of their positions once installed. Moreover, absolute position indicators such as those described above are intended to assist in the guidance of the vehicle through absolute positioning updates which is in contrast to the functionality and purpose of the present invention.

In the past, driverless vehicle guidance systems have also used position indicators, such as an array of magnets, to identify when a vehicle is at a predetermined marked location or station along the guide path. In complex guidance systems, a plurality of magnets have been used in unique combinations to identify many different stations. However, the use of magnets as a means for marking predetermined stations along the guide path has several shortcomings. For example, the number of polarity combinations available from such magnets do not provide the statistical variation in unique and arbitrary identifiers that is desirable in complex driverless vehicle applications. Accordingly, there is a desire to provide a simple, flexible, and inexpensive station control system which overcome the shortcomings of the prior art.

SUMMARY OF THE INVENTION

The present invention, referred to as a station control system, includes a reader mounted to the vehicle, tags disposed in readable proximity to the vehicle guide path, and a correlation table that associates each unique tag with a functional operation. When the station control system identifies that the vehicle has arrived at an unique tag or station, a functional operation instruction is provided from the correlation table, preferably stored in the on-board vehicle controller. In this manner, the system controls the operation(s) which the driverless vehicle performs at each station along the vehicle guide path.

The present invention provides many advantages and benefits. The station control system is relatively inexpensive and, thus, is an appropriate addition to lower cost driverless vehicles or carts. The station control system is flexible allowing, in a simple and low cost manner, for the creation of a correlation table associating the tags with corresponding functions as well as the addition, deletion, and/or replacement of a new station tag(s) and/or the functional operation(s) to be performed at a specific station(s).

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 1 is a schematic elevation view of a station control system for a driverless vehicle in accordance with the present invention;

FIG. 2 is a schematic plan view of the station control system illustrated in FIG. 1;

FIG. 3 is a graphic representation of a correlation table in accordance with the present invention; and FIG. 4 is a schematic of the host and vehicle communications system.

DETAILED DESCRIPTION OF THE PREFERRED EMBODIMENT

FIGS. 1 and 2 are schematic elevation and plan views, respectively, of a station control system 10 for a driverless vehicle 12 in accordance with the present invention. The driverless vehicle 12 can be controlled by any known guidance systems including an inertial guidance system, active or passive wire guidance system, optical guidance system, magnetic guidance system and the like. Notwithstanding the applicability of the present invention with a variety of guidance systems, the invention is particularly suitable for use with captive guidance systems without absolute position updates, e.g., where the vehicle senses or is otherwise constrained to move along a positive guide path. The guidance system is designed to steer and control the vehicle 12 along a guide path 14 while repeatedly monitoring the position of the vehicle 12 relative to the path 14. The present invention provides a station control system for the driverless vehicle in addition to and in cooperation with known guidance systems. Further, while the illustrated vehicle 12 and system 10 are shown in the context of a wheeled vehicle or cart supported by a floor, it should be appreciated that the control system and vehicle of the present invention may also be used in other material handling applications such as automated electrified monorails and the like.

The station control system 10 of the present invention includes a reader 16 mounted to the driverless vehicle 12 and station tags 18 positioned in readable proximity to the guide path 14. The tags 18 are positioned at locations along the guide path 14 wherein the vehicle 12 is to perform a predetermined function. For example, the tags 18 may be located at positioned where the vehicle 12 is to stop, operate an on-board conveyor, reset a release command, switch or change guidance modes, or perform any of a number of other functions commonly performed by driverless vehicles. The vehicle may perform the functions while stationary or moving. The reader 16 is selectively positioned on the driverless vehicle 12 so as to "read" station tags 18 disposed near or in proximity to the vehicle guide path 14. The station tags 18 are preferably attached to the floor 20 but may be disposed in other readable areas such as along a wall, conveyor 22, or other structure proximate the guide path. The station tags 18 may be attached with chemical mounting means (e.g., adhesives, epoxies, and the like) or mechanical mounting means (e.g. screws, bolts, and the like). The attachment mechanism preferably permits the tags 18, once worn, to be removed and replaced with new tags such as in the manner described below. The low cost of the tags 18 as well as the ease of replacement and updating of the correlation table provides numerous advantages over current systems.

The station control system 10 of the present invention is, in general, operationally separate from the guidance system of the vehicle 12, particularly in the sense that the control system 10 does not provide absolute positioning updates that are used by the guidance system to control vehicle movement relative to the guide path 14. Rather, the control system 10 determines from the unique or arbitrary tag identifier that the vehicle 12 is at a predetermined station or location and informs the vehicle 12 of the appropriate function to perform at the designated station. As a result of the limited information needed from the tags 18 and the use of the correlation table, the invention permits the use of a variety of low cost readers and identification tags for indicating when a vehicle 12 has reached a predetermined location or station.

In the illustrated embodiment of the present invention, the reader 16 and station tags 18 form a passive low-frequency 'magnetically coupled' RFID (Radio Frequency IDentification) subsystem using radio frequency communication to automatically identify operation stations near the path 14 along which the driverless vehicle 12 is guided. The station tags 18 may include a transponder and a tuned antenna-capacitor circuit for transmitting and receiving radio frequency signals respectively. The station tags 18 preferably do not require a power source such as a battery. Rather, the station tags 18 may be powered by a RF field generated by the reader 16. Upon being 'powered-up', a station tag will continuously transmit, by damping the incoming RF power field, a unique packet of encoded information. As noted, this "unique packet of information" is preferably simply a unique and arbitrary tag identifier that is associated to one or more functions in the correlation table. The encoded information is demodulated and decoded by an microcontroller inside the reader 16.

The above-described RFID reader 16 has three main functions: energizing, demodulating, and decoding. The reader 16 includes a tuned antenna-capacitor circuit which emits a low-frequency radio wave field. This low-frequency radio wave field is used to 'power-up' the station tags. The reader 16 does not require a line of sight to "read" a station tag 18. Thus, tags 18 which are dirt-covered, hidden, submerged and/or embedded can still be 'read' by the reader 16. Since the reader 16 does not require contact or line of sight, the system 10 provides flexibility in positioning the tags with respect to the path of the driverless vehicle. Notwithstanding the above description of the structure and function of the RFID reader 16, those skilled in the art will appreciate that a variety of different reader 16 capabilities may be used without departing from the scope of the invention defined by the appended claims.

While a variety of readers and tags are available in the art and may be used, readers and station tags distributed by INTERSOFT, having a place of business in Tullahoma, Tenn. are suitable for use with the present invention. The reader may be a long range RFID reader/decoder for passive RFID tags, such as INTERSOFT part number WM-RO-MR 8 square tag reader/decoder. Other readers may be used with the present invention. When selecting an appropriate reader, those skilled in the art will appreciate that the reader preferably has a sufficient reading window to permit the identification of tags within the guidance accuracy of the vehicle. Further, the antenna size of the reader should be large enough to provide the reader with sufficient time to read the tag as the vehicle passes over or in proximity to each tag. Thus, the size of the reader antenna should be selected based upon the speed and guidance accuracy of the vehicle as well as the read time for each tag, approximately sixteen milliseconds in the described embodiment. Preferably, the station tags are Passive Read-only RFID Tags, such as INTERSOFT part number EPD20RO. Notwithstanding the above-described transponder devices for use as station tags, those skilled in the art will appreciate that a variety of other tags may be used without departing from the scope of the present invention. For example, devices as simple as tags with bar codes and an appropriate bar code reader attached to the vehicle may be used to identify when the vehicle has reached a predetermined location or station.

Within the present invention, the station tags 18 are associated with functional operations through the use of a correlation table 24. A graphic representation of the correlation table 24 is illustrated in FIG. 3. In the correlation table 24 each unique tag 18 is associated with a specific station and a functional operation(s) to be performed at that specific station. As shown, the correlation table 24 may include tag identifier information, location information (such as a zone on the guide path that the vehicle is traversing, e.g., for traffic control or vehicle position monitoring), and functional operation information. Examples of the functional operations contained in the correlation table 24 include, but are not limited to, traffic control and performance of specified functional tasks—e.g., stopping, unloading, operating an on-board conveyor, resetting the release command, vehicle zone identification for traffic control, switching or changing the mode of guidance operation in a mixed-mode operation guidance system, etc.

The correlation table 24 is preferably created and maintained off-board each vehicle on a host system 26 but may also be created or manufactured through a configuration tool post 30 on a vehicle (FIG. 4). The host system 26 and each vehicle 12 include communication modules generally known in the art that permit transfer of data between the host system 26 and each vehicle 12. The correlation table 24 may be created, maintained, re-programmed, or revised, either automatically or manually, to (1) associate a new replacement tag to a pre-existing station, (2) associate a command/function with a new tag, or (3) change the operation(s) associated with a current station tag without affecting the correlation or association of other tags.

After the correlation table 24 has been created and/or updated, such as in the manner described in greater detail below, the host system 26 preferably downloads the correlation table 24 to each vehicle 12. The table is then stored in a memory device of the vehicle controller 28 so that the controller may look-up the function associated with any specific tag 18 as needed. Alternatively, the correlation table 24 may be maintained in the host system 26 whereupon the vehicle 12 transmits the tag identifier information received by the reader 16 to the host system 26. The host system 26 then identifies the function corresponding to or associated with a specific tag 18 and communicates the function to the vehicle 12 for performance. Downloading of the correlation table 24 to each vehicle is preferred in order to reduce the frequency of communication between the host system and the vehicles.

In operation, the vehicle 12 moves along the guide path 14 under the guidance of a conventional vehicle guidance system. When the vehicle is in readable proximity to a station tag 18, the reader 16 receives tag identifier information from the tag. The vehicle controller 28 then causes a search of the correlation table, either by directly searching the table if on board the vehicle or communicating the tag identifier to the host system if the table is off board, and retrieves any function commands associated with the tag identifier.

It is noted that the specific form of the correlation table may vary. For example, while the function fields illustrated in the correlation table of FIG. 2 show only a single function associated with each tag identifier, the function fields may contain a variety of commands executable by the vehicle. For example, it is contemplated that the function field may contain one or more command lists—such as an arrival list, a destination list, and/or a release list. Each of these "lists" may contain none, one or multiple executable function commands. In a representative embodiment, the arrival list associated with a tag identifier would contain one or more arrival commands (such as, for example, slow, execute a precision stop, turn sonics off, or generate a predetermined signal) executed by the vehicle when the tag is first recognized by the reader. No more than one list of arrival commands is normally associated with a station. Upon completion of any arrival list command(s), the vehicle controller would identify, such as by accessing the on-board correlation table or through a signal from the host system, any destination list associated with the tag identifier. Each destination list may contain multiple destination commands associated with destinations (e.g., numeric values given to the vehicle by the host system) along the guide path. In multi-vehicle systems, vehicles commonly have varying destination valuesto allow different vehicles to perform different destination functions at the same point along the travel path. The vehicle controller can be configured to perform destination commands at any time, including immediately after completion of the arrival function or some time thereafter. Upon completion of any appropriate destination list commands, or the determination that no destination command need be performed, the vehicle may receive a command from the host system to exit the station or continue moving along the path until it reads another tag. The exit command may also be included in a separate field in the correlation table or contained in the arrival list or a destination list. The exit command is normally accompanied by a route number—a numeric value indicating the route that the vehicle is to follow. After receipt of the exit command, the vehicle controller searches the correlation table for any release command in the release list associated with the tag identifier and the route number. Upon identification of a matching release list, the vehicle executes the commands therein and then commences or continues its travel.

By way of further illustration, a representative set of functions associated with a tag identifier 04032183 is shown in the following correlation table entry.

| Tag ID | Station | Function Commands |
|---|---|---|
| 04032183 | 1 | Arrival List<br>SET SPEED TO SLOW<br>PERFORM PRECISION STOP<br>Destination Lists<br>Destination 1<br>FOLLOW LEFT GUIDEPATH<br>Destination 2<br>FOLLOW RIGHT GUIDEPATH<br>Destination 10<br>WAIT FOR 30 SECONDS<br>FOLLOW RIGHT GUIDEPATH<br>RELEASE (EXIT STATION) WITH ROUTE 3<br>Release Lists<br>Route 3<br>SET DESTINATION TO 10<br>SET SPEED TO MEDIUM<br>Route 5<br>SET SPEED TO FAST |

This correlation table entry contains one arrival list, three destination lists, and two release lists. In this example, if a vehicle having a Destination Value of 10 reads the 04032183 tag, the vehicle will:

1) Set its speed to slow;
2) Perform a precision stop;
3) Wait for 30 seconds;
4) Set up its guidance mechanism to follow a right-hand branch when a guidepath branch is next encountered;
5) Issue a release (exit) command to itself with a route of 3;
6) Set it's Destination Value to 10;
7) Set it's speed to medium; and
8) Commence travel (inherently performed after the release list for Route 3 is executed).

With the above in mind, it should be appreciated that the tags 18 of the present invention provide path markers of entirely arbitrary message content that are unique relative to one another. Each tag is different in the type of message content, that is, the tag identifier read by the reader. While each tag has a unique and arbitrary message content, the tags share common characteristics to permit reading by the same device. The message or identifier of each tag is arbitrary in the sense that it does not depend upon the overall system, the position of the tag once installed, any tag specific coding, or other variables. The identification information provided by the tag may be a decodable bar code label or preprogrammed binary number having a wide statistical variation so as to ensure that no two tags have the same identifier. This unique and arbitrary identifier or message content for each tag is then associated with a predetermined function in the correlation table to provide the benefits discussed herein. The preprogrammed unique tags, each with an entirely arbitrary message content, are inexpensive relative to other position indicators used in the art yet permit easy system configuration by a customer or installer as well as facilitating manual or automatic update of the correlation table upon replacement of a tag.

When installing the control system of the present invention, the vehicle is preferably moved along its guidance path after identification tags 18 have been placed in proximity to the guide path at desired locations. At this time, the correlation table or database has yet to be created. During this first operating mode (initial configuration), the reader identifies tags in proximity to the moving vehicle and responds with the arbitrary tag identifier message. The system then determines that no function has been associated with the tag identifier in the correlation table. The host system, or each vehicle as described below, includes a configuration tool to permit association of a function with the tag identifier. This input may be performed in a variety of manners, preferably through a Window's based pull down menu by the configurator. Various functions, as noted above, may be input including one or more task functions, identification of a zone for traffic control, and conditional functions. It should be appreciated that the creation of the correlation table is preferably done visually by a human operator during the initial configuration mode. Once the correlation table has been configured for the first identified tag, the vehicle is traversed to index with the next tag and the aforementioned process is repeated until the vehicle has been moved through the system to create the fully functional correlation table. As a result, each tag identifier may be associated with its zone or functional operation.

The present invention, including the simplicity of the tags, reader, and use of the correlation table, also permits updating of the correlation table during a normal operating, running, or maintenance mode. For example, in the event a tag is worn or otherwise unreadable, the tag may be removed and replaced with a new preprogrammed unique tag having a different and entirely arbitrary message content, e.g., identification information. When a vehicle traversing the guide path reads the identifier, the identifier will not be included in the correlation table. The vehicle then stops, reports the absence of the identifier from the table, and awaits instructions. The new instructions may be provided either manually or automatically. For example, in the automatic tag update feature of the present invention, the host system 26 can automatically update the tag identifier and location information in the correlation table 24 when a station tag 18 is replaced. Upon receipt of new tag information, the host system 26 can determine the last tag for which the vehicle successfully read the identification information and received an associated function from the correlation table, determine that the new tag is a replacement tag, and substitute the arbitrary message content of the new tag for the old tag and associate this identifier with the existing function command. The updated correlation table may then be downloaded to each vehicle or the new functional command reported to each vehicle.

It should be appreciated that the automatic update feature may be performed automatically, either through the host system or by individual vehicles, or may prompt the customer to verify that the determined update is appropriate. Thus, this feature automatically updates the correlation table 24 when (1) a station tag 18 is added or (2) a worn or damaged station tag 18 is replaced.

The configuration tool permitting the customer to create and maintain the correlation table is described above as being associated with the host system. This association is particularly appropriate if traffic control of the vehicles within the system is desired. If central control is not a concern, the host system may be eliminated. In such instance, the vehicle will preferably have a plug-in port to accommodate the configuration tool for initial system set-up and changes. Upon creating the correlation table in the manner described above, the initial correlation table is downloaded to each vehicle directly from the configuration tool.

With the above in mind, it should be appreciated that the present invention uses preprogrammed unique tags having entirely arbitrary message content to provide a station control system for a driverless vehicle. The preprogrammed tags offer customer simplicity in creation of the correlation table, such as through the described configuration tool. Thus, the customer can easily and efficiently install and configure the system without detailed knowledge of tag programming. The configuration tool permits the creation and updating of the correlation table and modification of the traffic control or task functional performance through Window's based applications requiring only pointing and clicking during customization. Writing of information to tags to indicate functions to be performed is not required. Moreover, the system provides virtually an infinite number of unique and arbitrary tag identifiers that facilitates the use of the system in complex driverless vehicle applications. For example, a supply of preprogrammed tags may be shipped to the customer with the vehicle. The customer may then select and install tags at random as each tag has a unique and arbitrary identifier that can be later associated with its location and/or function(s) in the correlation table.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A station control system comprising:

a vehicle travel path;

a plurality of station tags in readable proximity to the travel path, each of said tags being pre-programmed with a unique tag identifier having arbitrarily assigned information for identifying said tag; and a vehicle movable along said travel path, said vehicle having a tag reader and a controller communicating with said reader, said tag reader configured to read tag identifiers from said tags, said controller configured to receive said tag identifiers from said tag reader and access a correlation table having a function command for performing a task, said function command being associated with said tag identifier and independent from other function commands associated with each of said other tag identifiers.

2. The system of claim 1 wherein said correlation table is stored in said vehicle controller.

3. The system of claim 1 wherein said a correlation table has a tag identifier field and a function field associated with each tag identifier field.

4. The system of claim 1 wherein said correlation table further includes a location field associated with each of said tag identifier fields, said location field providing a location of the tag.

5. The system of claim 1 wherein said vehicle further includes a guidance system that operates independent of said station tags.

6. The system of claim 1 wherein said tags are passive read only RFID transponder tags that transmit tag identification information to the reader in response to excitation by the reader.

7. The system of claim 1 further including a host processor communicating with said vehicle controller, said vehicle controller communicating tag identifier information to said host processor, said host processor configured to permit entry of function commands in said function fields.

8. A driverless vehicle for use in a station control system with a plurality of station tags in readable proximity to a vehicle travel path, each of the station tags being preprogrammed with a unique and arbitrary tag identifier, said vehicle comprising:

a tag reader configured to read tag identifiers from said tags; and a controller communicating with said tag reader, said controller configured to receive the tag identifiers from said tag reader and, in response to the tag identifiers, access a correlation table having function commands associated with tag identifiers.

9. The vehicle of claim 8 wherein said correlation table is stored in said vehicle controller.

10. The vehicle of claim 9 wherein said a correlation table has a tag identifier field and a function field associated with each tag identifier field.

11. The vehicle of claim 8 wherein said correlation table further includes a location field associated with each of said tag identifier fields, said location field providing a location of the tag along the travel path for traffic control.

12. The vehicle of claim 8 wherein said vehicle further includes a guidance system that operates independent of said station tags.

13. A method of controlling the operation of a driverless vehicle using a plurality of station tags and a correlation table, each of the plurality of station tags having a preprogrammed arbitrary and unique tag identifier, the correlation table having a tag identifier field and a function field associated with each tag identifier field, said method comprising:

reading the tag identifier associated with one of the plurality of tags;

accessing the correlation table to identify a command in the function field associated with the tag identifier; and executing any identified command.

14. The method of claim 13 further including searching the tag identifier fields in the correlation table to identify the tag identifier field associated with said one of the plurality of tags.

15. The method of claim 13 wherein said correlation table includes a location field and wherein the method further includes communicating the location entry associated with the tag identifier to a host system.

16. The method of claim 13 further including reading the tag identifier associated with another of the plurality of tags after executing any identified command of said one of the plurality of tags.

17. The method of claim 13 further including updating the correlation table if the correlation table does not include a function associated with the tag identifier.

18. The method of claim 13 further including the step of configuring the station control system prior to operation, said step of configuring the station control system including randomly selecting several of the plurality of tags, arbitrarily positioning said selected tags in readable proximity to the travel path, moving the vehicle along the travel path, reading a tag identifier from one of the tags, adding a function command to the correlation table, said function command being associated with the tag identifier, and reading a tag identifier from another of the selected tags.

19. The method of claim 18 further including communicating the tag identifier to a host controller and using the host controller to perform the step of adding a function command to the correlation table.

20. The method of claim 19 further including communicating the updated correlation table to the vehicle.

* * * * *